US010717598B2

(12) United States Patent
Davison, Jr.

(10) Patent No.: US 10,717,598 B2
(45) Date of Patent: Jul. 21, 2020

(54) METHOD AND APPARATUS FOR CONTAINMENT, SHIPPING, AND STORAGE OF ARTICLES

(71) Applicant: Daniel P. Davison, Jr., Norman Park, GA (US)

(72) Inventor: Daniel P. Davison, Jr., Norman Park, GA (US)

( * ) Notice: Subject to any disclaimer, the term of this patent is extended or adjusted under 35 U.S.C. 154(b) by 41 days.

(21) Appl. No.: 15/695,228

(22) Filed: Sep. 5, 2017

(65) Prior Publication Data

US 2018/0009604 A1 Jan. 11, 2018

Related U.S. Application Data

(63) Continuation-in-part of application No. 15/153,635, filed on May 12, 2016, now Pat. No. 9,751,547.

(60) Provisional application No. 62/160,565, filed on May 12, 2015.

(51) Int. Cl.
*B65G 1/02* (2006.01)
*B62B 5/00* (2006.01)
*B62B 3/00* (2006.01)

(52) U.S. Cl.
CPC ............... *B65G 1/02* (2013.01); *B62B 3/002* (2013.01); *B62B 3/003* (2013.01); *B62B 5/0093* (2013.01)

(58) Field of Classification Search
CPC .......... B65G 1/02; B62B 3/002; B62B 3/003; B62B 5/0083; B62B 5/0093
See application file for complete search history.

(56) References Cited

U.S. PATENT DOCUMENTS

| 3,815,966 | A | | 6/1974 | Lyman, Jr. | |
|---|---|---|---|---|---|
| 4,557,201 | A | | 12/1985 | Webb, Jr. | |
| 4,925,357 | A | | 5/1990 | Cisternino et al. | |
| 5,340,268 | A | * | 8/1994 | Dowty | B66F 9/18 414/608 |
| 5,395,199 | A | * | 3/1995 | Day, III | G11B 15/683 180/168 |
| 6,082,956 | A | | 7/2000 | Pentland | |
| 6,895,301 | B2 | * | 5/2005 | Mountz | G05D 1/0274 700/113 |
| 7,912,574 | B2 | * | 3/2011 | Wurman | G05B 19/4189 700/213 |
| 8,170,711 | B2 | * | 5/2012 | D'Andrea | B66F 9/063 700/214 |

(Continued)

FOREIGN PATENT DOCUMENTS

JP 11049279 A 2/1999

*Primary Examiner* — James Keenan
(74) *Attorney, Agent, or Firm* — Bell Nunnally & Martin LLP (57) ABSTRACT

The present invention relates to a storage unit for containment, shipping, and storage of articles. The storage unit includes a base and a frame. In various embodiments, the frame may be generally rectangular and defining a storage region therein. The base of the storage unit is designed to matingly engage with a removable wheeled dolly. In a typical embodiment, the dolly facilitates maneuverability and positioning of the storage unit, particularly in confined areas. In various embodiments, a single dolly may facilitate manipulation of multiple storage units, wherein the dolly may be attached to a storage unit while the storage unit is in use and removed when the storage unit is in long-term storage, thereby reducing the space required to store the storage unit.

3 Claims, 11 Drawing Sheets

(56) References Cited

U.S. PATENT DOCUMENTS

| | | |
|---|---|---|
| 8,240,681 B2 | 8/2012 | Taguchi |
| 8,444,369 B2 * | 5/2013 | Watt ................... B65G 49/00 |
| | | 414/809 |
| 8,602,443 B2 | 12/2013 | Moore et al. |
| 8,820,757 B2 | 9/2014 | Szasz |
| 9,211,900 B2 | 12/2015 | Knepp |
| 9,415,984 B1 * | 8/2016 | Shinosky, Jr. ............ B66F 9/12 |
| 9,481,512 B2 * | 11/2016 | Diniaco ............. B65D 90/0073 |
| 9,792,577 B2 * | 10/2017 | Mountz ................ G06Q 10/087 |
| 9,962,830 B1 * | 5/2018 | Tubilla Kuri ........ G05B 19/041 |
| 2008/0110905 A1 | 5/2008 | Cowie et al. |
| 2013/0154216 A1 | 6/2013 | Paulk, Sr. et al. |
| 2013/0187352 A1 | 7/2013 | Hassell et al. |
| 2014/0033956 A1 | 2/2014 | Kelly et al. |

* cited by examiner

METHOD AND APPARATUS FOR CONTAINMENT, SHIPPING, AND STORAGE OF ARTICLES

CROSS-REFERENCE TO RELATED APPLICATIONS

The present application is a continuation-in-part of U.S. patent application Ser. No. 15/153,635, filed May 12, 2016, entitled, "Method and Apparatus for Containment, Shipping, and Storage of Articles," which claims the benefit under 35 U.S.C. § 119(e) of U.S. Provisional Patent Application Ser. No. 62/160,565, filed May 12, 2015, entitled, "Method and Apparatus for Containment, Shipping, and Storage of Articles," which is hereby incorporated by reference for all purposes.

BACKGROUND

Field of the Invention

The present application relates generally to shipping and storage devices and methods and more particularly, but not by way of limitation, to a storage unit designed to matingly engage a removable wheeled dolly and methods for utilizing such a storage unit to provide offsite storage.

Background

It has become increasingly common for companies to lease portable storage and moving containers to commercial entities and individuals. Such storage containers provide sheltered and secure storage space to business entities and individuals at relatively low costs. Additionally, the portable nature of storage and moving containers also makes such containers convenient for moving items and for storing items offsite. Oftentimes, storage and moving containers are delivered to a location where they are loaded and then transferred off-site to a long-term storage facility. When being loaded and moved, it is desirable that such storage containers be wheeled to facilitate maneuverability of the storage containers. However, wheels add cost and take up additional space in long-term storage.

SUMMARY OF THE INVENTION

The present invention relates to a storage unit for containment, shipping, and storage of articles. The storage unit includes a base and a frame. In various embodiments, the frame may be generally rectangular and define a storage region therein. The base of the storage unit is designed to matingly engage with a removable wheeled dolly. In a typical embodiment, the wheeled dolly facilitates maneuverability and positioning of the storage unit, particularly in confined areas. In various embodiments, a single dolly may facilitate manipulation of multiple storage units, wherein the dolly may be attached to a storage unit while the storage unit is in use and removed when the storage unit is in long-term storage, thereby reducing the space required to store the storage unit.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Various embodiments of the present invention will now be described more fully with reference to the accompanying drawings. The invention may, however, be embodied in many different forms and should not be construed as limited to the embodiments set forth herein.

Figure 1:
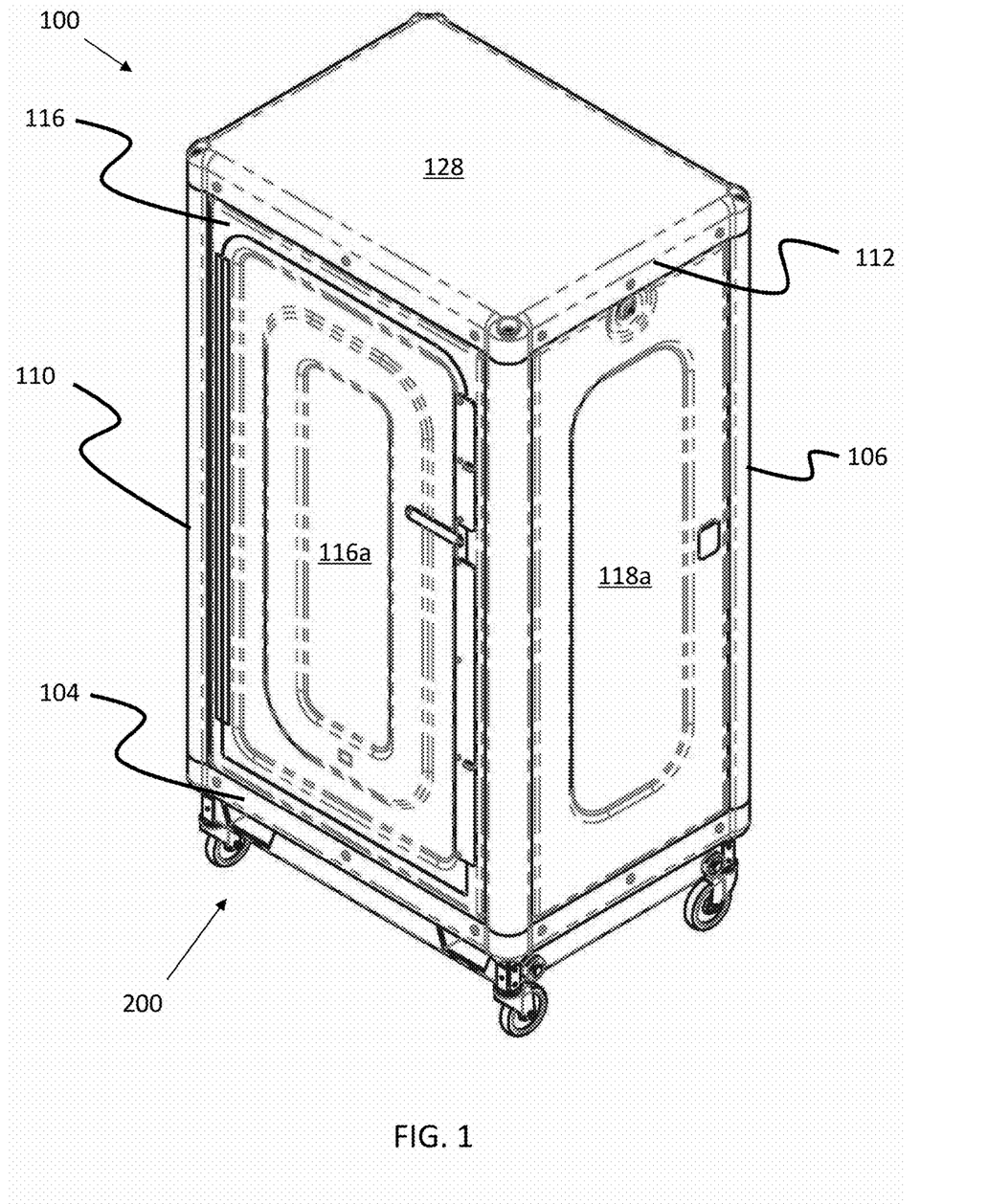
FIG. 1 is a perspective view of a storage unit attached to a wheeled dolly according to an exemplary embodiment.

FIG. 1 is a perspective view of a storage unit 100 according to an embodiment of the present invention. The storage unit 100 includes a base 104, a frame 106, and a top surface 128. The frame 106 is constructed of a plurality of upright members 110 and a plurality of cross members 112. In a typical embodiment, the frame 106 is enclosed by exterior panels. In a typical embodiment, the exterior panels surround the frame 106 on the top, front, back, and two opposed sides of the storage unit 100. In the embodiment shown, a front panel 116 and a side panel 118a can be seen disposed between the upright members 110 and cross members 112. In various embodiments, the front panel 116 and side panel 118a may be permanently affixed to the frame 106 or may be removably attached to the frame 106. The frame 106 defines a storage region therein. In various embodiments, the frame 106 may be constructed of a lightweight material such as, for example, polyvinylchloride; however, in other embodiments, the frame 106 is constructed from materials such as, for example, aluminum or various composite materials as dictated by design requirements. In a typical embodiment, outer edges of the upright member 110 may be rounded or padded to reduce damage, for example, to walls or other objects in the event the storage unit 100 impacts a wall or other object. The frame 106 is coupled to the base 104. As will be discussed in more detail below, a shipping dolly 200 is removably coupled to an underside of the base 104. In a typical embodiment, the shipping dolly 200 facilitates maneuverability and positioning of the storage unit 100, particularly in confined areas.

Still referring to FIG. 1, in a typical embodiment, the storage region of the storage unit 100 may be dimensioned to accommodate a number of storage containers therein. By way of example, the storage region may be, in a particular embodiment, dimensioned to be approximately 33 inches wide, approximately 25 inches deep, and approximately 58 inches high without the dolly 200 and 67 inches high with the dolly 200. However, in other embodiments, either the storage unit 100 or the storage region may be dimensioned to accommodate any number of storage containers as dictated by design requirements. In various embodiments, the storage unit 100 may be loaded with, for example, luggage or hanging garments. The storage unit 100 may include a garment hanger (not shown) that includes a bar extending across an inside of the storage region. In various embodiments, the garment hanger may be placed between opposed cross members 112 of the frame 106 to facilitate hanging of, for example, garments therefrom. In the embodiment shown, the garment hanger may be removably attached to a connector 105a located in side panel 118a. In some embodiments, additional reinforcement may be added to side panel 118a to further support the garment hanger. In various embodiments, the top surface 128 may contain indentations, protrusions, latches, or other additions to facilitate stacking a second storage unit on top of storage unit 100.

Figure 2:
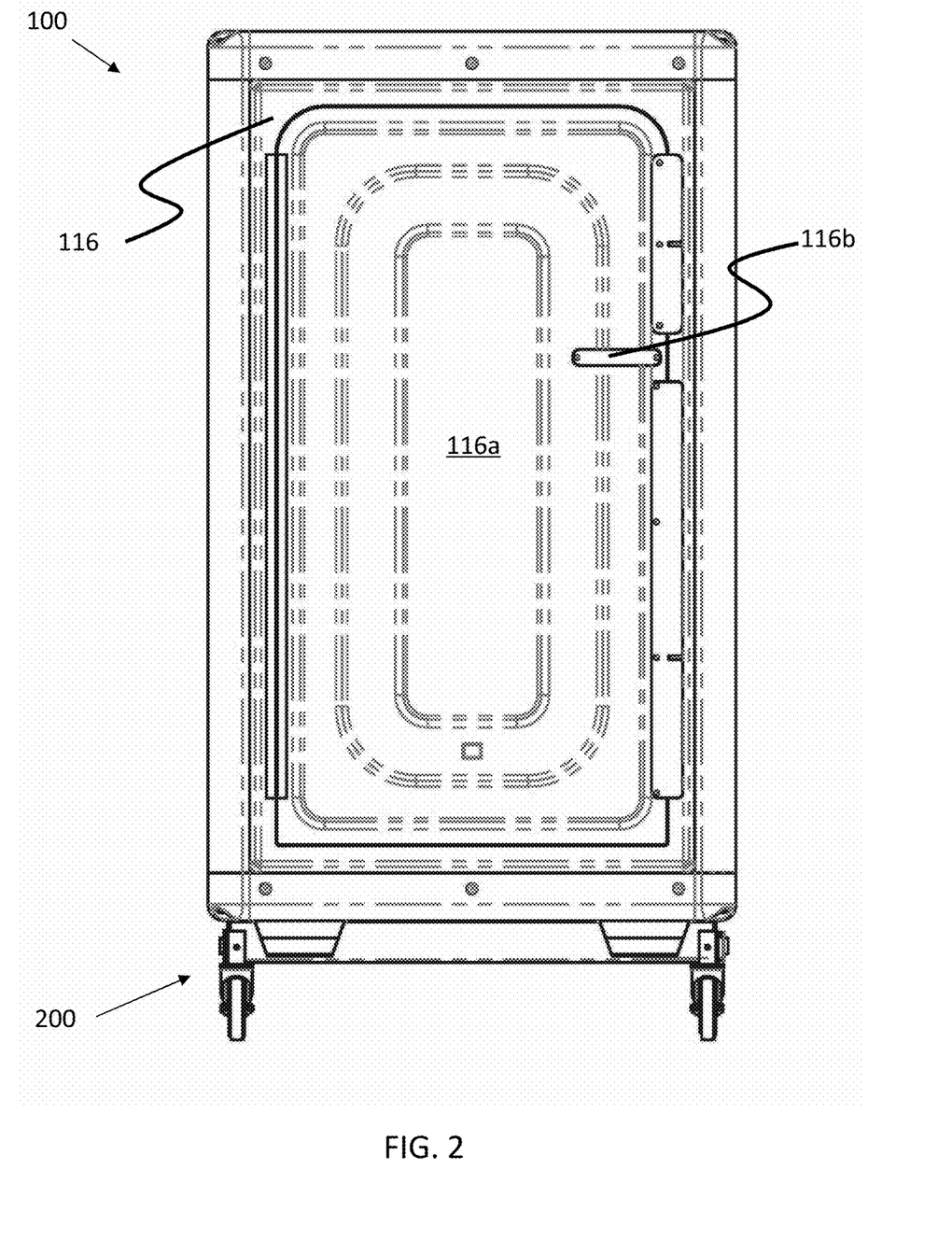
FIG. 2 is a front view of the storage unit of FIG. 1 according to an exemplary embodiment.

Referring now to FIG. 2, a front view of the front side of the storage unit 100 is shown. In the embodiment shown, a front panel 116 of the storage unit 100 includes a hinged door 116a having a lockable latch 116b that secures the storage region from unauthorized access. The lockable latch 116b may include a pad lock, key lock, combination lock, electronic lock or other locking mechanism to secure the contents. In a typical embodiment, the front panel 116 and the door 116a are sealed so as to protect the contents in the storage region from the elements and prevent infiltration of, for example, rainwater, dust, etc. In a typical embodiment, the front panel 116 and the door 116a are constructed of materials such as, for example, thermoform plastic, aluminum, various composite materials, fiberglass, or other appropriate material as dictated by design requirements. In various embodiments, at least one of the front panel 116 and the door 116a may be vented to allow circulation of air through the storage region.

Figure 3:
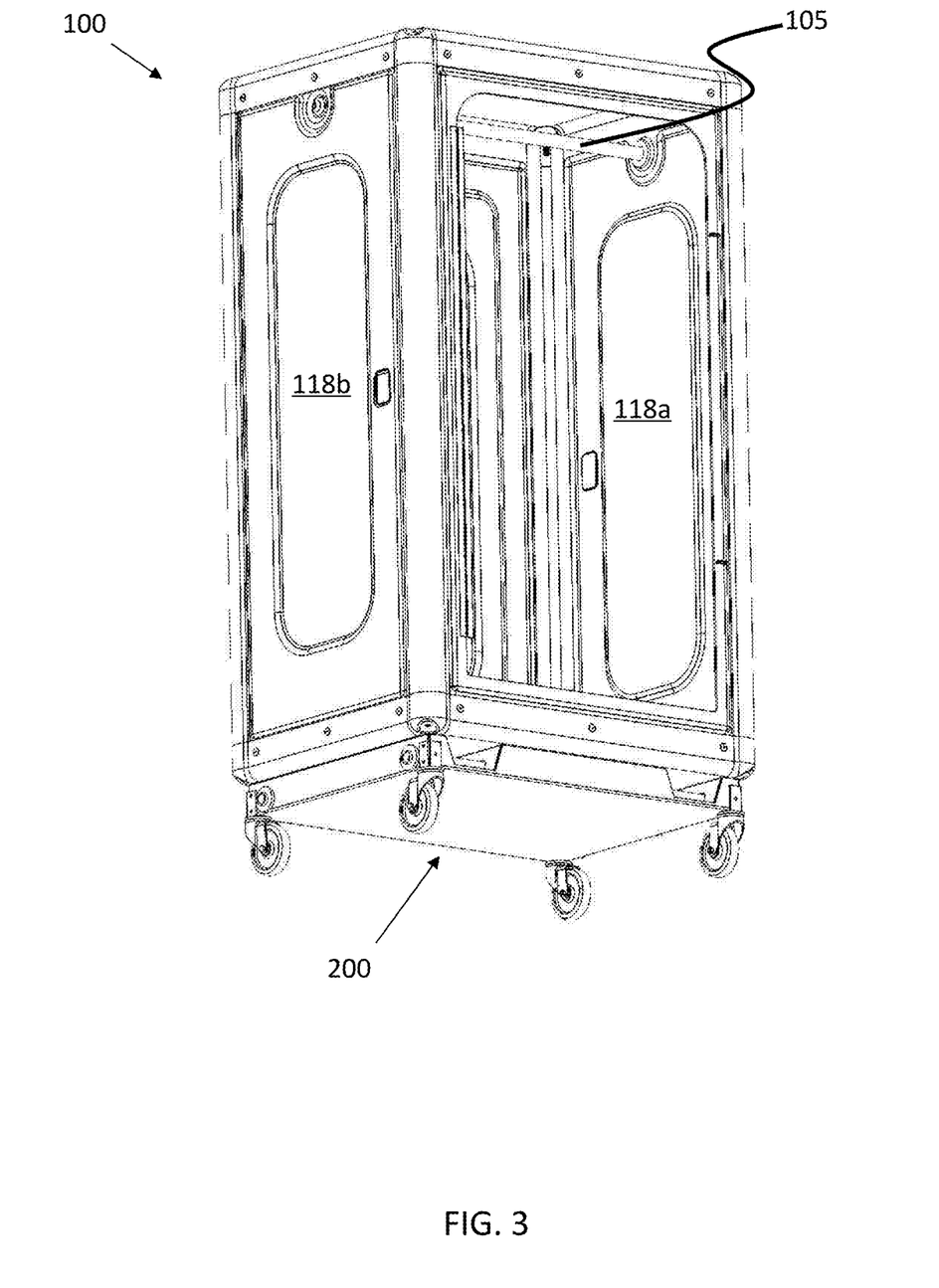
FIG. 3 is a perspective view of the storage unit of FIG. 1 having a front door removed according to an exemplary embodiment.

Referring now to FIG. 3, a perspective view of the front side of the storage unit 100 is shown having the door removed. As can be seen in the embodiment shown, a garment hanger 105 can be seen extending between two opposite side panels 118a and 118b. In various embodiments, the storage area inside storage unit 100 may contain shelves or slots for shelves to be added. In addition to having a removable door, in various embodiments, some or all of the panels may be removable. In some embodiments the top surface or the base may be removable to facilitate nesting of multiple storage units. Although the embodiment shown is generally rectangular, in various embodiments, the storage unit may be a cube or may have one or more angled or sloped sides to facilitate nesting.

Figure 4:
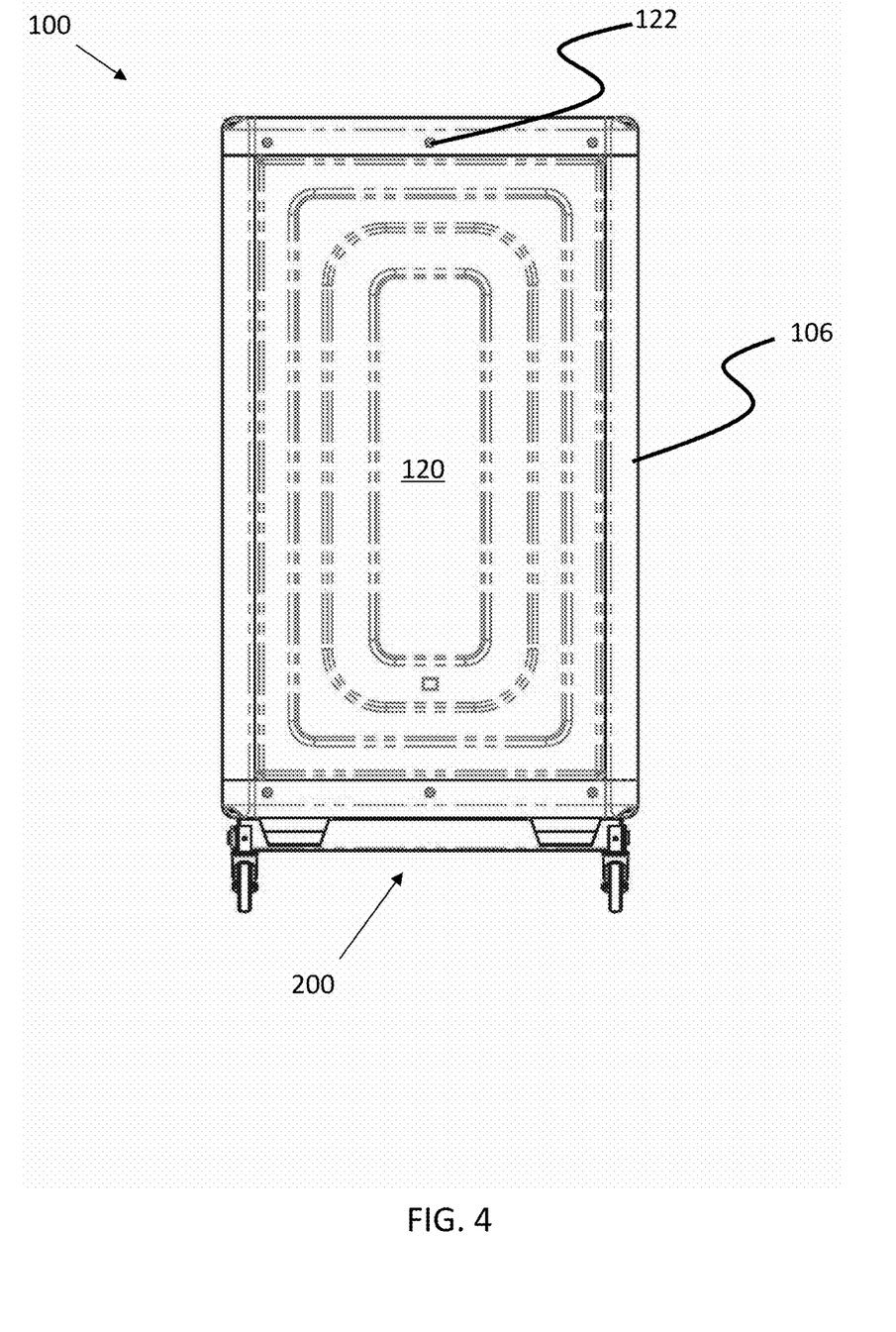
FIG. 4 is a back plan view of the storage unit of FIG. 1 according to an exemplary embodiment.

Referring now to FIG. 4, a back view of the storage unit 100 is shown. In the embodiment shown, back panel 120 of the storage unit 100 can be seen. In a typical embodiment, back panel 120 does not include a door. In various embodiments, the back panel 120 may include a door or other means of facilitating access to the storage region. In the embodiment shown, back panel 120 is permanently affixed to frame 106 by a plurality of rivets 122. In various embodiments, back panel 120 may be affixed to frame 106 via other attachment methods, such as screws or glue, or may be removably coupled to frame 106.

Figure 5:
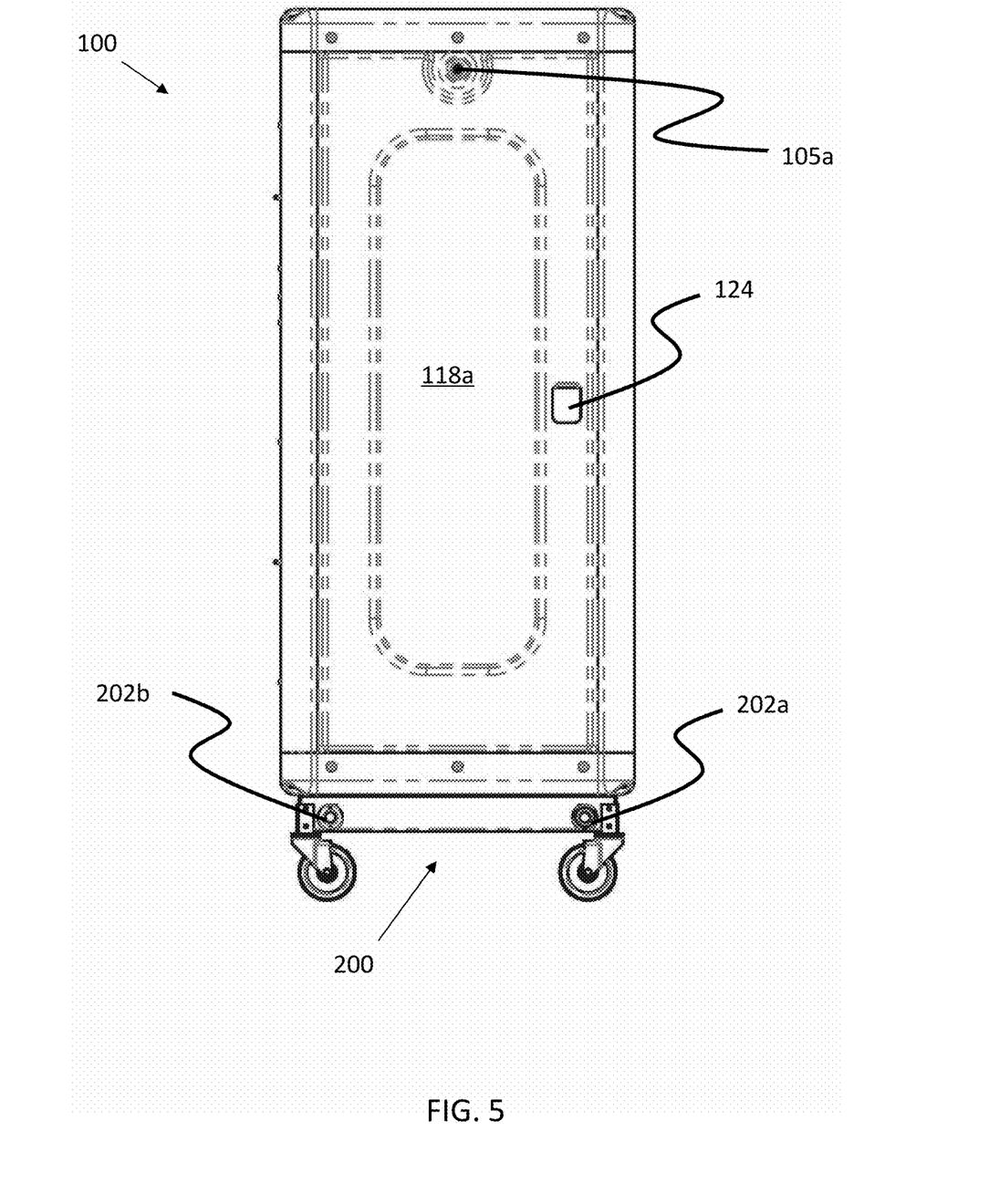
FIG. 5 is a side plan view of the storage unit of FIG. 1 according to an exemplary embodiment.
Figure 6:
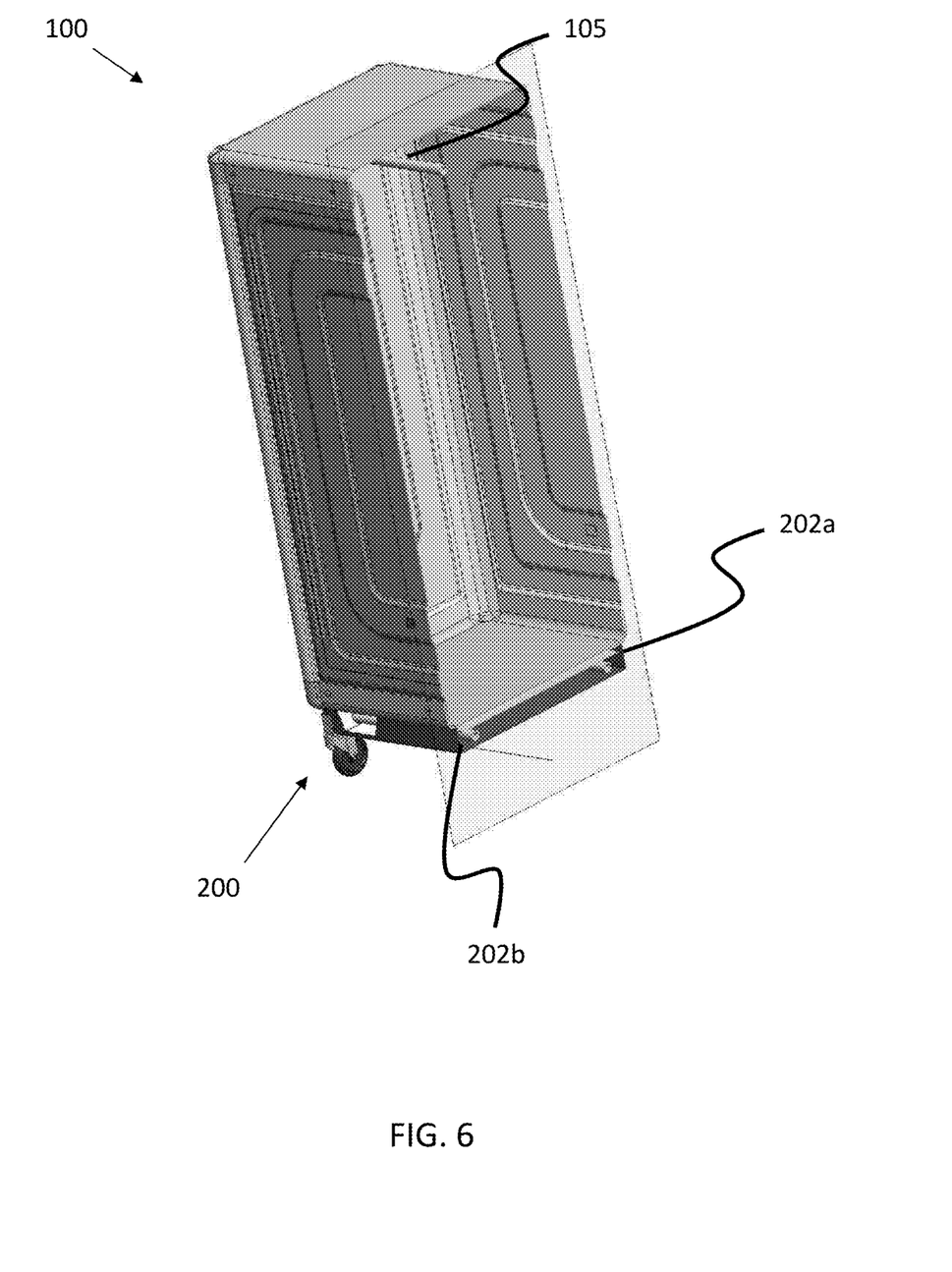
FIG. 6 is a sectional perspective view of the storage unit of FIG. 1 according to an exemplary embodiment.

Referring now to FIG. 5, a side view of the storage unit 100 is shown. In the embodiment shown, side panel 118a of the storage unit 100 can be seen having a garment hanger connector 105a and a latch 124. As can be seen, storage unit 100 has a dolly 200 attached to an underside thereof. As will be explained in more detail below, ends of attachment rods 202a and 202b can be seen. Referring now to FIG. 6, a perspective view of a cross section of storage unit 100 is shown. In the embodiment shown, garment hanger 105 can be seen extending through the storage region of the storage unit 100. Attachment rods 202a and 202b can be seen extending through base 200.

Figure 7:
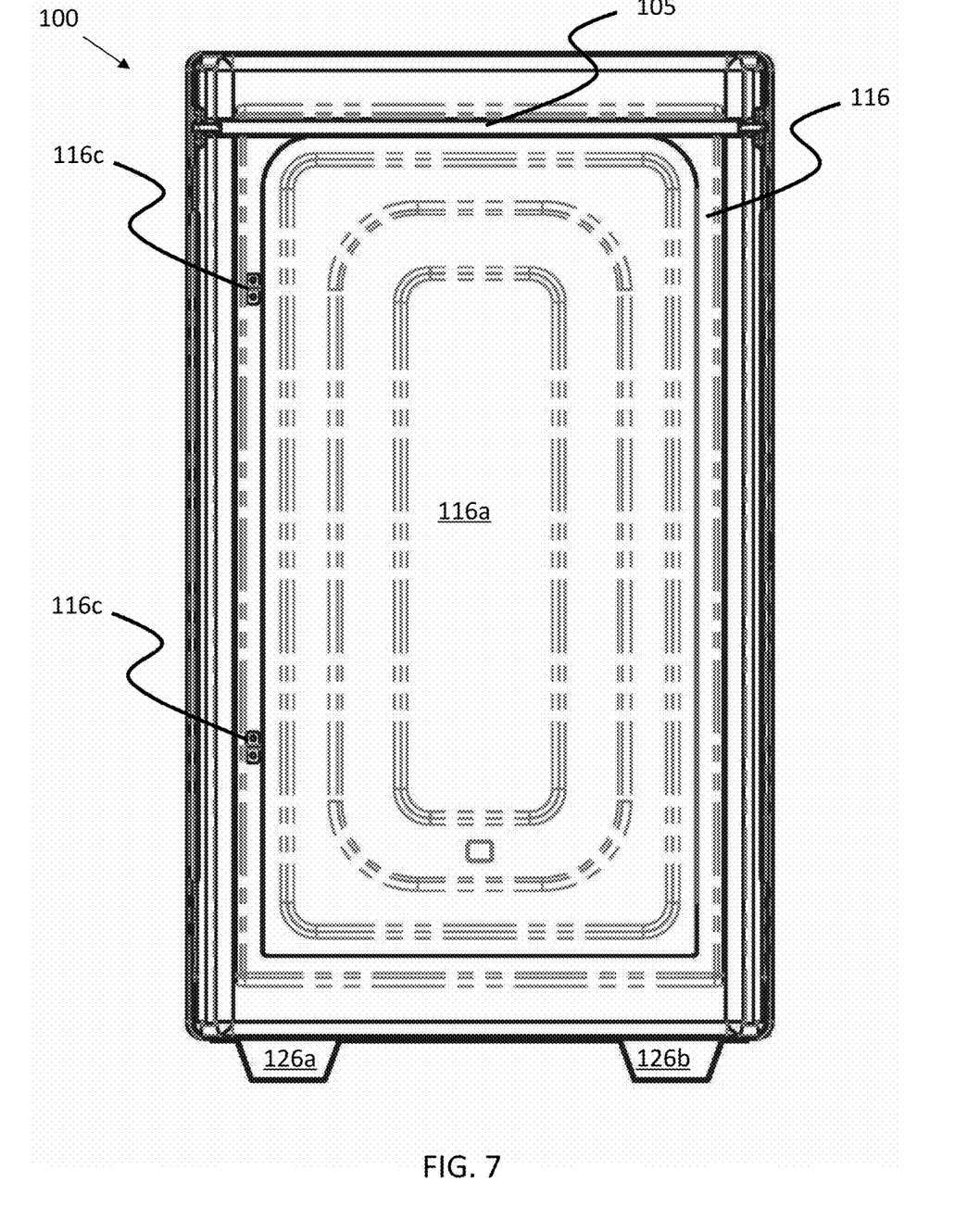
FIG. 7 is a back plan view of a cross section of the storage unit of FIG. 1 along a midline thereof having the dolly removed therefrom.

Referring now to FIG. 7, a cross section view of storage unit 100 is shown. An inside of front panel 116 can be seen having door 116a. In the embodiment shown, the front panel 116 may be locked from the outside and the locking mechanism contains reinforcements 116c on the inside to enhance the security of the storage unit 100. Garment hanger 105 can be seen extending through the storage region of the storage unit 100. The base 104 of storage unit 100 contains feet 126a and 126b extending downward therefrom. As explained in more detail below, in various embodiments, feet 126a and 126b may be configured to mate with corresponding grooves in the dolly (not shown). In various embodiments, feet 126a and 126b may be sized to facilitate tines of a forklift being inserted therethrough for lifting storage unit 100.

Figure 8:
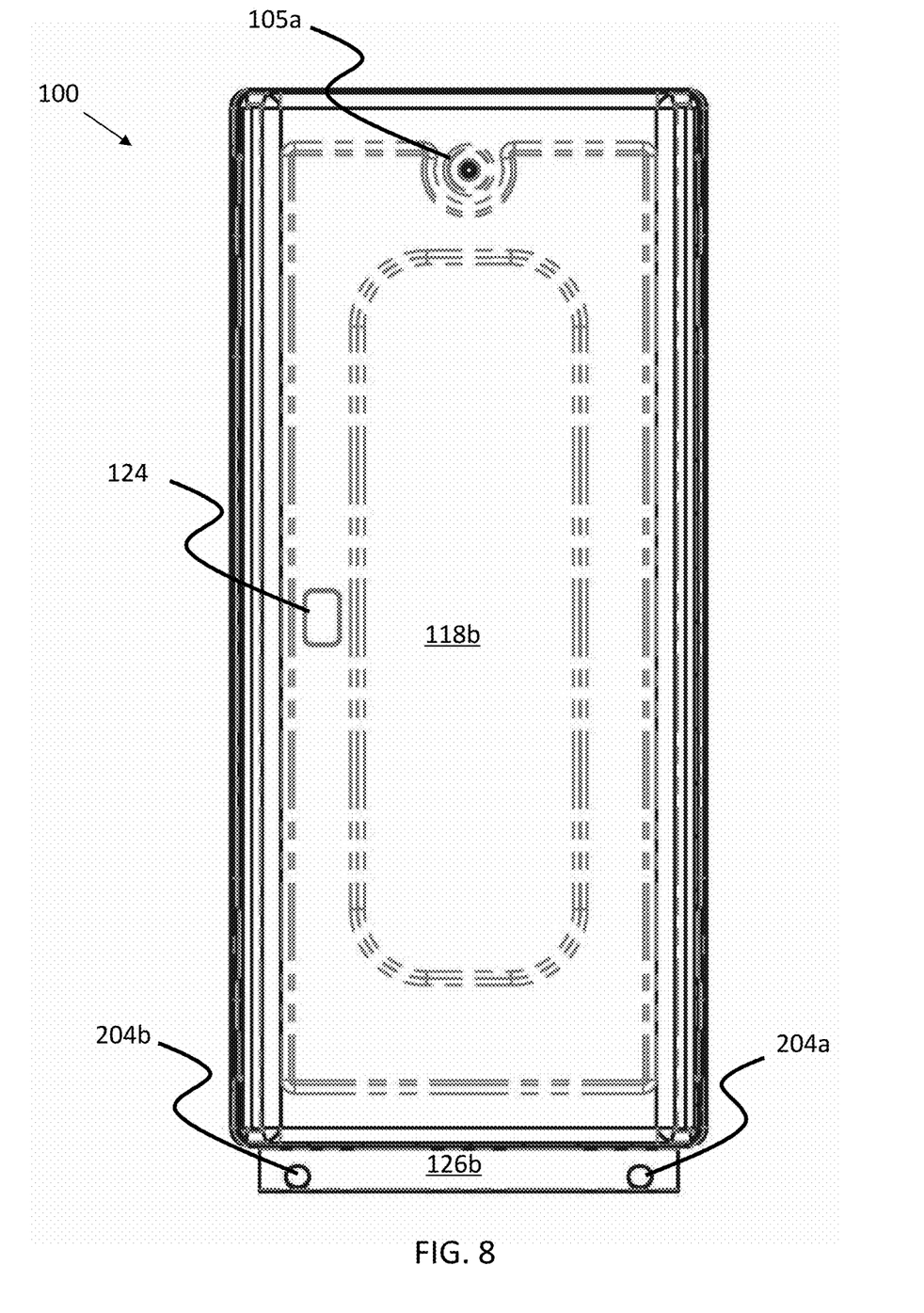
FIG. 8 is a side plan view of the storage unit of FIG. 1 having the dolly removed therefrom.

Referring now to FIG. 8, a side view of storage unit 100 is shown detached from the dolly (not shown). From this view, side panel 118b can be seen having latch 124 and garment hanger connector 105a. Foot 126b of base 104 can be seen extending downward from storage unit 100. As explained in more detail below, in various embodiments, foot 126b may contain holes 204a and 204b through which connector rods (not shown) may pass for coupling the storage unit 100 to the dolly (not shown).

Figure 9:
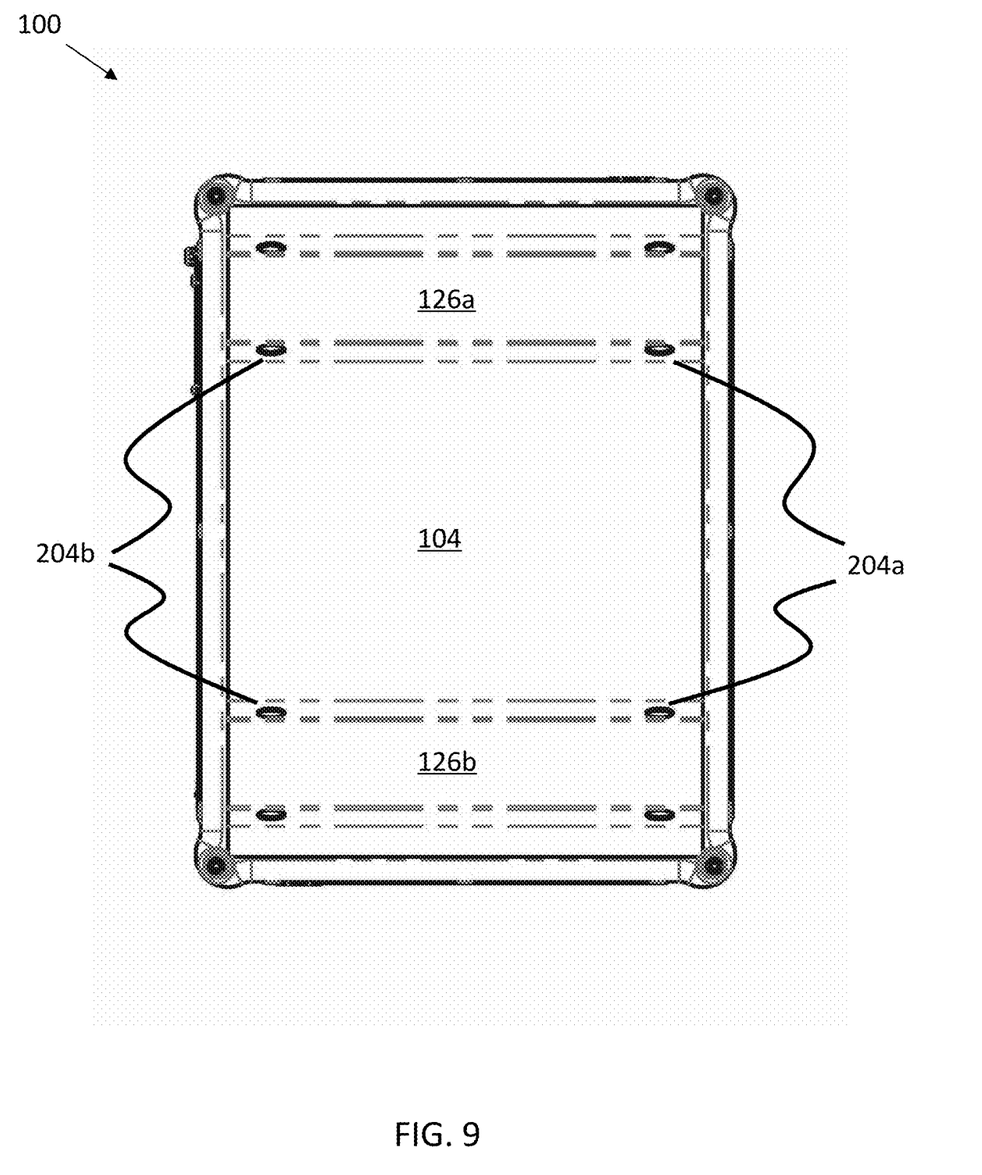
FIG. 9 is a bottom plan view of the storage unit of FIG. 1 according to an exemplary embodiment.

Referring now to FIG. 9, a bottom view of storage unit 100 is shown detached from the dolly (not shown). In various embodiments, the base 104 may contain feet 126a and 126b disposed on opposite ends of the base 104 and extending from the front to the back of base 104. In other embodiments, more or less feet may be disposed on the base 104. As can be seen, holes 204a and 204b extend through feet 126a and 126b.

Figure 10:
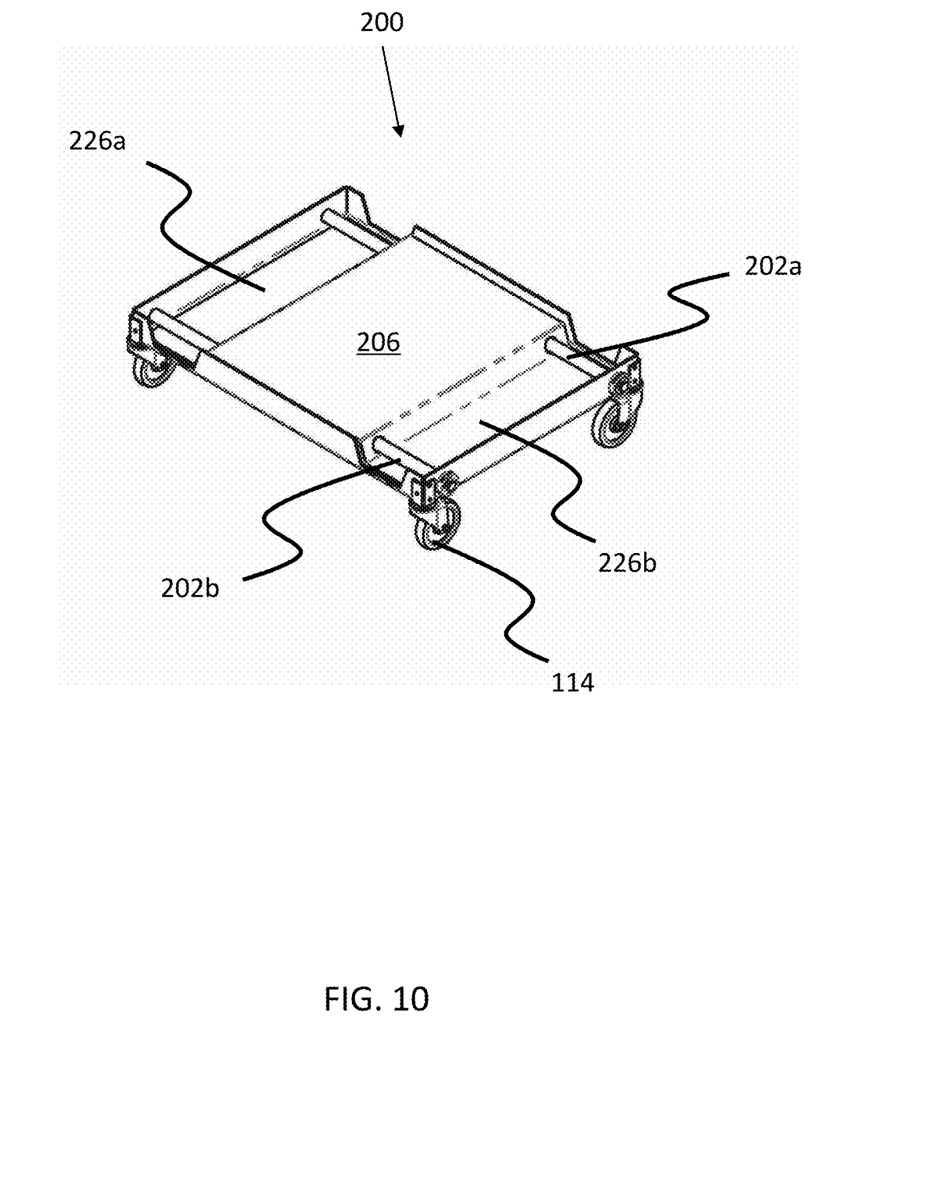
FIG. 10 is a perspective view of the wheeled dolly of FIG. 1 according to an exemplary embodiment.

Referring now to FIG. 10, a perspective view of the shipping dolly 200 for use with the storage unit 100 is shown. The shipping dolly 200 includes a platform 206 and a plurality of wheels 114 coupled to the platform 206. In some embodiments, the dolly 200 may be motorized, self-propelled, and/or remotely controllable, either wired or wirelessly. In some embodiments, the dolly 200 may be coupled to a controller that includes route information allowing the dolly to automatically go to a specific location or destination. In a typical embodiment, the plurality of wheels 114 are, for example, approximately five inches in diameter. By way of example, the platform 206 in the embodiment shown contains four wheels 114; however, in other embodiments, the platform 206 may contain more or fewer wheels 114 as dictated by design requirements. In a typical embodiment, at least two of the wheels 114 are able to swivel about a vertical axis so as to facilitate maneuverability; however, in other embodiments all or none of the wheels 114 may swivel. In some embodiments, the wheels 114 may be casters, may be lockable or may be retractable. In a typical embodiment, the dolly 200 may be removably coupled to an underside of the base 104 of storage unit 100. In various embodiments, dolly 200 may include troughs 226a and 226b on opposite sides thereof shaped to matingly engage feet 126a and 126b of base 104 (not shown). In various embodiments, dolly 200 may include holes corresponding to holes 204a and 204b of base 104 (not shown) aligned in registry therewith and configured to allow connector rods 202a and 202b to pass therethough to securely affix dolly 200 to base 104. In various embodiments, the troughs 226a and 226b may be configured to allow tines of a forklift to fit under connector rods 202a and 202b to facilitate lifting of the storage unit 100 when the dolly 200 is attached thereto. In other embodiments, latches (not shown) for securing the dolly 200 to the storage unit 100 may be included in addition to or in place of the connector rods. In some embodiments, the dolly 200 may be locked to the storage unit 100, such as via an external lock to prevent unauthorized removal of the dolly 200 or a lock internal to the storage unit 100 to prevent unauthorized separation of the dolly 200 without opening lockable latch 116b.

Figure 11:
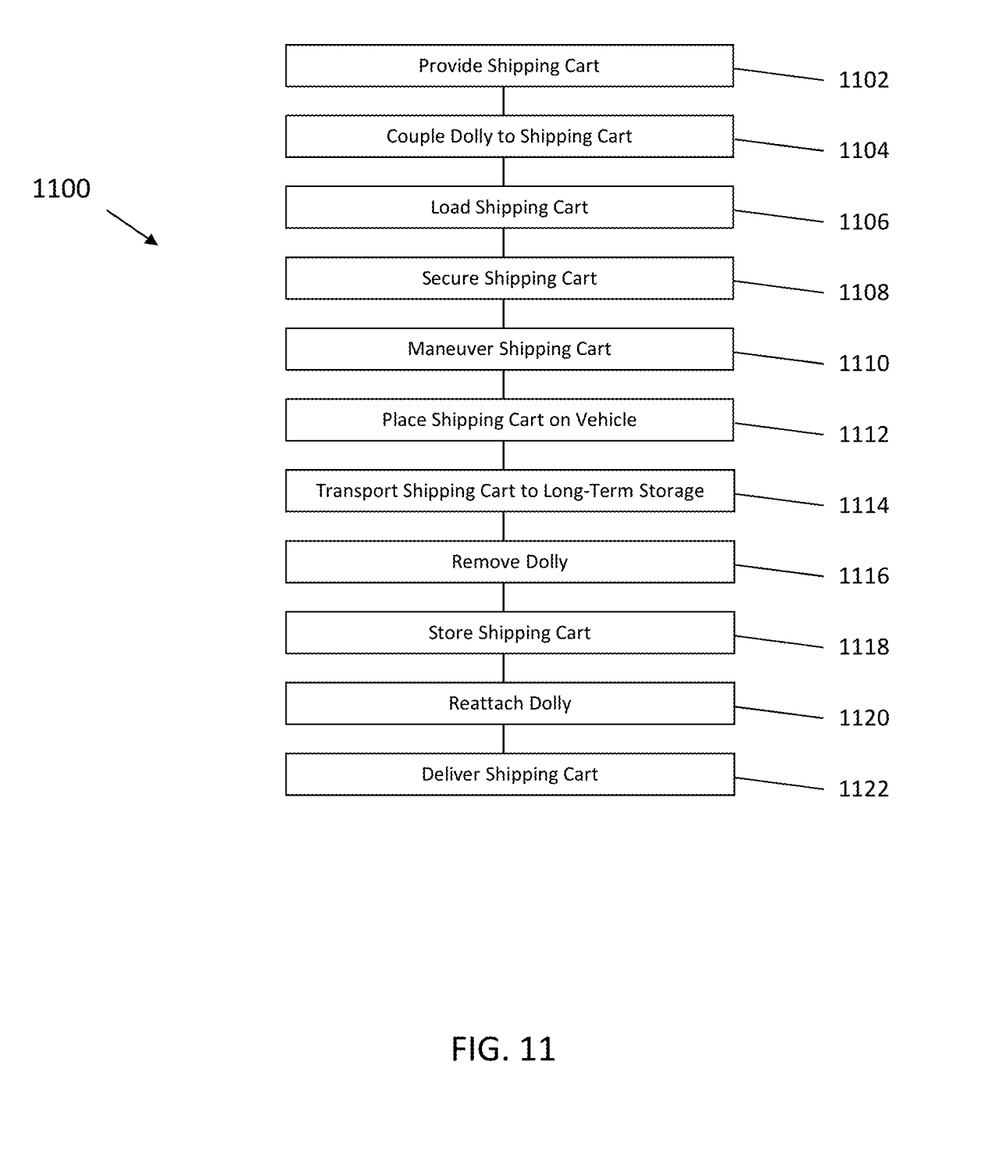
FIG. 11 is a flow diagram of a method for shipping and storing the storage unit of FIG. 1.

Referring now to FIG. 11, a flow diagram of a process 1100 for shipping and storing the storage unit is described. The process 1100 begins at step 1102 when a storage unit is provided. At step 1104, a dolly is coupled to the underside of the base of the storage unit to allow the storage unit to be rolled around and delivered to a location. At step 1106, the storage unit is loaded with, for example, a plurality of storage containers. In various embodiments, however, the storage unit may be loaded with, for example, luggage, hanging garments, or other items as dictated by needs. In a typical embodiment, the storage unit may be dimensioned such that approximately ten storage containers may fit into the storage region with minimal excess space; however, in other embodiments, the storage unit may be dimensioned as necessary according to design requirements. In various embodiments, a plurality of storage units may be utilized having different heights, but having similar sized bases such that one or more dollies of a standard size may be coupled to the various storage units.

Still referring to FIG. 11, at step 1108, the storage unit is secured from unauthorized access. In a typical embodiment, securement of the storage unit includes locking a door. At step 1110, the storage unit is maneuvered, via the dolly, to a designated pick-up location. At step 1112, the storage unit is placed on a shipping vehicle. In various embodiments, the storage unit may be rolled onto a shipping vehicle or may be placed on the shipping vehicle via, for example, a crane or a forklift. In other embodiments, the shipping vehicle is equipped with a lifting mechanism that places the storage unit on the shipping vehicle. In a typical embodiment, the shipping vehicle is dimensioned to accommodate a plurality of storage units with minimal wasted space. In some embodiments, the dolly may be secured to the shipping vehicle. In other embodiments, the dolly may be removed and the storage unit may be secured to the shipping unit. At step 1114, the shipping vehicle transports the storage unit to, for example, a long-term storage facility. At step 1116, the dolly is removed from the storage unit to reduce the amount of space necessary to store the storage unit. In various embodiments, the dolly may be removed prior to loading the storage unit onto the shipping vehicle. At step 1118, the storage unit is stored in the long-term storage facility. At step 1120, when it is time to deliver the storage unit, the storage unit is removed from long term storage and the dolly is reattached to the storage unit. The storage unit is then delivered to its final destination. In various embodiments, the dolly may remain coupled to the storage unit throughout the process, including during long term storage. In various embodiments, the storage unit may be utilized to provide offsite storage in an urban environment, for example, by storing a plurality of storage units at a storage facility and then delivering and retrieving storage units in response to requests received from owners of the articles contained in the storage units. In various embodiments, the contents of the shipping unit are indexed and an owner of the contents may order specific items to be retrieved and the shipping unit containing those items will be provided to the owner. In various embodiments, the storage units may include beacons, antennae, transmitters, and/or receivers to provide location tracking of the storage units.

Although various embodiments of the method and system of the present invention have been illustrated in the accompanying Drawings and described in the foregoing Specification, it will be understood that the invention is not limited to the embodiments disclosed, but is capable of numerous rearrangements, modifications, and substitutions without departing from the spirit and scope of the invention as set forth herein. It is intended that the Specification and examples be considered as illustrative only.

What is claimed is:

1. A method of providing off-site storage of articles comprising:
    providing a plurality of storage units, each storage unit having a base, the base comprising first and second feet protruding from a bottom surface thereof and having holes extending therethrough, the second foot being spaced from the first foot;
    providing a plurality of wheeled dollies, each wheeled dolly configured to be removably coupled to the base of a storage unit, each wheeled dolly comprising first and second troughs on an upper surface thereof contoured to receive the first and second feet of the base, the first and second troughs having holes extending therethrough, wherein, when the first and second feet are received in the first and second troughs, the holes in the first and second feet align in registry with the holes in the first and second troughs;
    coupling a wheeled dolly of the plurality of wheeled dollies to a storage unit of the plurality of storage units by inserting one or more connector rods through the holes in the first and second feet and the holes in the first and second troughs;
    delivering the storage unit and the wheeled dolly to a location for articles to be loaded into the storage unit;
    retrieving the storage unit and the wheeled dolly from the location;
    uncoupling the wheeled dolly from the storage unit by removing the one or more connector rods;
    storing the storage unit at a storage facility;
    receiving a request for the storage unit;
    coupling a wheeled dolly of the plurality of wheeled dollies to the storage unit by inserting the one or more connector rods through the holes in the first and second feet and the holes in the first and second troughs;
    delivering the storage unit and the wheeled dolly to a destination for the articles to be unloaded; and
    retrieving the storage unit and the wheeled dolly from the destination.

2. The method of claim 1, wherein the location and the destination are the same.

3. The method of claim 1 and further comprising: tracking the storage unit as the storage unit is delivered to the location.

\* \* \* \* \*